United States Patent
Kirschner (10) Patent No.: US 7,809,182 B2
(45) Date of Patent: Oct. 5, 2010

(54) METHOD AND DEVICE FOR SUPPRESSING ELECTROMAGNETIC BACKGROUND RADIATION IN AN IMAGE

(75) Inventor: Holger Kirschner, Widnau (CH)

(73) Assignee: Leica Geosystems AG, Heerbrugg (CH)

( * ) Notice: Subject to any disclaimer, the term of this patent is extended or adjusted under 35 U.S.C. 154(b) by 1175 days.

(21) Appl. No.: 10/482,279

(22) PCT Filed: Jun. 7, 2002

(86) PCT No.: PCT/EP02/06239

§ 371 (c)(1),
(2), (4) Date: Feb. 3, 2004

(87) PCT Pub. No.: WO03/005057

PCT Pub. Date: Jan. 16, 2003

(65) Prior Publication Data

US 2004/0208340 A1    Oct. 21, 2004

(30) Foreign Application Priority Data

Jul. 6, 2001    (EP) .................................. 01116378

(51) Int. Cl.
 G06K 9/00    (2006.01)
 G06K 9/36    (2006.01)
(52) U.S. Cl. ................. 382/154; 382/103; 382/287; 382/291
(58) Field of Classification Search ............... 382/291, 382/287, 154, 106, 284; 33/154, 106, 284
 See application file for complete search history.

(56) References Cited

U.S. PATENT DOCUMENTS

| 3,174,045 | A | * | 3/1965 | Whitney et al. | .......... | 250/208.2 |
|---|---|---|---|---|---|---|
| 3,507,595 | A | * | 4/1970 | Ragnar | ........................ | 356/5.1 |
| 3,723,003 | A | * | 3/1973 | Vockenhuber et al. | ..... | 356/3.06 |
| 5,224,176 | A | * | 6/1993 | Crain | .......................... | 382/136 |
| 5,334,848 | A | * | 8/1994 | Grimm | ........................ | 250/548 |
| 5,351,117 | A | * | 9/1994 | Stewart et al. | ................. | 356/30 |
| 5,420,682 | A | * | 5/1995 | Haggerty et al. | ............. | 356/328 |
| 5,673,082 | A | * | 9/1997 | Wells et al. | .................. | 348/139 |
| 5,684,531 | A | * | 11/1997 | Li et al. | ....................... | 348/139 |
| 5,901,236 | A |  | 5/1999 | Mizui | | |
| 6,075,905 | A | * | 6/2000 | Herman et al. | ............... | 382/284 |
| 6,078,681 | A | * | 6/2000 | Silver | .......................... | 382/133 |
| 6,232,602 | B1 | * | 5/2001 | Kerr | ........................... | 250/330 |
| 6,278,522 | B1 | * | 8/2001 | Lepper et al. | ................ | 356/416 |
| 6,681,057 | B1 | * | 1/2004 | Nair et al. | .................... | 382/294 |
| 6,711,280 | B2 | * | 3/2004 | Stafsudd et al. | ............. | 382/106 |
| 6,810,135 | B1 | * | 10/2004 | Berenz et al. | ................ | 382/118 |
| 6,970,236 | B1 | * | 11/2005 | Markantes et al. | ............ | 356/71 |

(Continued)

FOREIGN PATENT DOCUMENTS

JP    A-06-235609    8/1994

(Continued)

*Primary Examiner*—Wenpeng Chen
*Assistant Examiner*—Gandhi Thirugnanam
(74) *Attorney, Agent, or Firm*—Oliff & Berridge, PLC (57) ABSTRACT

A method for suppressing electromagnetic background radiation in the image according to a precharacterization, a device for carrying out the method according to a precharacterization, a measuring instrument, and a use of the device for identifying a laser signal as a mark for subsequent measuring processes as well as for identifying a source of a laser signal.

11 Claims, 7 Drawing Sheets

U.S. PATENT DOCUMENTS

| | | | |
|---|---|---|---|
| 7,298,922 B1 * | 11/2007 | Lindgren et al. | 382/294 |
| 7,356,165 B2 * | 4/2008 | Takarada | 382/103 |
| 2002/0164069 A1 * | 11/2002 | Nagano et al. | 382/154 |
| 2002/0176605 A1 * | 11/2002 | Stafsudd et al. | 382/106 |
| 2003/0123707 A1 * | 7/2003 | Park | 382/106 |
| 2003/0168582 A1 * | 9/2003 | Bala et al. | 250/234 |
| 2003/0215127 A1 * | 11/2003 | Stern et al. | 382/141 |
| 2005/0217969 A1 * | 10/2005 | Coombs et al. | 194/206 |
| 2010/0002947 A1 * | 1/2010 | Riley et al. | 382/254 |

FOREIGN PATENT DOCUMENTS

| | | |
|---|---|---|
| JP | A-09-210622 | 8/1997 |

* cited by examiner

METHOD AND DEVICE FOR SUPPRESSING ELECTROMAGNETIC BACKGROUND RADIATION IN AN IMAGE

BACKGROUND

The invention relates to a method for suppressing electromagnetic background radiation in an image according to a precharacterization, a device for carrying out the method according to a precharacterization, a measuring instrument, and a use of the device for identifying a laser signal as a mark for subsequent measuring processes as well as for identifying a source of a laser signal.

The detection of individual signals or complete signatures of electromagnetic radiation has a wide range of uses. It is possible to make a distinction between two fundamental objects.

On the one hand, a radiation source (target source) or the real or virtual image thereof is to be detected and its position or its direction determined. Applications exist here, for example, in the automatic orientation of measuring instruments or the detection of radiation sources in the military sector (for example, for detecting an opponent's target illumination or distance measurement, as part of an active protection system). Other applications are the tracking of laser radiation for controlling autonomous vehicles or the detection and tracking of astronomical objects. The emitted radiation can in principle have a continuous spectrum or a line spectrum. However, the detection of a source requires information about its spectral characteristic, which may be relatively constant, for example, for lasers but are subject to greater uncertainties for thermal emitters, owing to the temperature-dependent emission.

On the other hand, the position of objects should be detectable by marks (target illumination), for example, by means of a light spot or a reflector which, in the case of divergent irradiation, is detectable on the basis of its high reflectivity. Thus, for example, in the geodetic area for surveying purposes, the position of reflecting points which have, for example, prism reflectors, corner cubes or reflector foils can be precisely determined. For this purpose, a laser signal is emitted (target illumination) and the direction from which any reflected radiation arrives is determined. This makes it possible to mark, or to make, markable, specific points, for example, on machines or buildings, by mounting a reflector and to measure their position automatically.

In geodetic applications, for example, a search by means of a laser spot is used, together with a theodolite, for determining the direction in which a reflector (prism arrangement) is present. For this purpose, a laser signal is emitted by a theodolite. If this signal is incident on a reflector prism, the laser beam is reflected back and can be received again in the theodolite. A similar application is the guidance of automatic robot systems by light marks or reflecting marks in the production sector.

Problems with the detection and position determination of electromagnetic signals are presented in particular by existent interfering radiation, such as, for example, the background radiation of the daytime sky, direct sunlight, interior lighting of rooms or thermal emitters, such as, for example, metallic melts in industrial applications.

In the case of unfavourable distance conditions, such interfering radiation may be stronger than the signal to be measured. Particularly when lasers are used as signal sources, problems arise since, for safety reasons, especially for the protection of the human eye, their power is not permitted to exceed certain values.

The influence of the interfering radiation is eliminated in methods of the prior art by a light/dark differential image method. For this purpose, one measurement is carried out with the signal source (target source or target illuminator) switched on and a further measurement is carried out with the signal source switched off. The signal, for example, a laser spot or the radiation returning from a reflecting mark, can be extracted from the difference between the two measurements.

A corresponding device in the form of a camera system with light having controlled distance measurement for telerobotic applications is disclosed in the Patents U.S. Pat. No. 5,673,082 and 5,684,531. By means of the camera system, images are recorded with a laser switched on and switched off. A comparison of the images which is carried out pixel by pixel and in which identical pixels are eliminated from the image leads to a differential image which should include only the laser spot.

The U.S. Pat. No. 5,901,236 describes a method and a device for position measurement by image processing. Here, an object to be measured is provided with a light-emitting source, for example, a light-emitting diode (LED), which is periodically switched on and off. Four successive images of the object are recorded with an exposure time of a quarter of the period of the light-emitting source and differential images generated in each case from the first and third and from the second and fourth image. The differential image having the greatest brightness is used for the position measurement. This procedure is intended to ensure that the switched-on and switched-off states are subtracted from one another for at least one of the two differential images.

For exact position determination at distances of more than 50 m, known methods require the use of an arrangement (array) of a plurality of sensors for the detection. Examples of such sensor arrays are large-area sensors, such as CCD or CMOS camera sensors and CMOS- or CCD-based line sensors. An image of a three-dimensional region (field of view) to be evaluated is generated by an optical system on the sensor array and is converted into a signal by the sensor array.

If a signal to be detected is present in the field of view, said signal is registered, for example, as a bright point of a laser spot, in the image. In contract to individual sensors, for example, position sensitive device (PSD) (large-area diodes which determine the position of the centre of gravity of a light beam incident on their sensor surface), in the case of sensor arrays the interfering radiation incident, optionally from the entire environment, is distributed over a multiplicity of part-sensors (pixels) of the array. This division results in a smaller interfering signal and hence an improved signal/noise ratio. This increases the reliability of the signal detection and enhances the resolution of the position determination. Moreover, in the case of individual sensors, the dynamics of the sensor is exceeded by intense interfering radiation and hence a measurement is impossible. For example, the recording of the sun in the image section rapidly leads to supersaturation of the sensor.

However, the increased positional resolution of sensor arrays is offset by the disadvantage of a substantially increased time requirement for a measurement in comparison with individual sensors. This increased time requirement is due to the numerous part-sensors of the sensor array which are to be evaluated for a measurement.

If it is intended to achieve a positional accuracy in the sub-10 angular second range, this results in a lower limit for the number of individual sensors in the sensor array, with a given constant size of the field of view. In some cases, less than 200 images per second can be read out from sensor arrays of the lower to middle segment which are suitable for this purpose.

When the light/dark differential image method is used, this comparatively long measuring time gives rise to the problem of the change of an environment to be considered during the measuring time.

For example, atmospheric turbulences during the measuring time decisively influence the apparent position of remote objects. Moreover, it may be desirable to perform scan movements during the measuring process with the measuring arrangement in order to be able to evaluate a greater direction range. This too results in a rapid change in the image content. In addition, moving interfering objects, for example, traveling motor vehicles, can greatly change the image content during the measuring process.

If, apart from the signal to be analysed, the image content changes decisively between light image and dark image, the signal can no longer be extracted without errors from the difference between the two images. This faulty signal in turn gives rise to errors in the detection and in the determination of the signal position.

It is therefore the object of the invention to provide a method and a device by means of which a detection and position determination of an electromagnetic signal in a considered field of view is improved.

It is a further object to ensure safe and reliable identification of the signal also in the case of a strong or moving interfering radiation background or in the case of changes in the field of view.

These objects are achieved, according to the invention, by the characterizing features described in this specification. Advantageous and alternative embodiments and further developments of the method and of the device are evident from the features of the subclaims.

BRIEF SUMMARY

The invention is based on the concept of using, for the extraction of the signal in a differential image method, two images of different spectral ranges which are recorded simultaneously or with a sufficiently small time interval and which are designated as a positive image (P-image) and negative image (N-image). The negative image (N-image) generally includes information which is required for extracting the signal from the P-image. The negative image is therefore not necessarily the mirror image of the object of the recording and also not necessarily inverted with respect to the light/dark characteristic.

The wavelength selectivity in the recording of the images is furthermore preferably described by the use of spectral filters but can also be achieved by direct, selective, responsivity, for example, by the use of corresponding semiconductor materials as sensor material. These include in particular sensor arrays in which each individual sensor is capable simultaneously of providing separate information about different spectral ranges. Furthermore, a laser spot (target laser) is described purely by way of example as the signal to be detected.

A first image, which is to be designated below as P-image, is recorded using a spectral filter which in particular allows the sighting laser wavelength to pass through. Background radiation from foreign sources is attenuated by the filter but as a rule cannot be entirely eliminated. This applies in particular to broadband thermal emitters, such as, for example, the sun or incandescent lamps, but also to stray emitters having a line spectrum, which have spectral lines in the vicinity of the wavelength of the sighting laser.

Examples of interfering emitters with a line characteristic are the gas discharge and fluorescent tubes used for illumination or the presence of laser sources in addition to the sighting laser.

For a second image, designated below as N-image, the wavelength of the laser light is excluded from the image. For the exact characteristic of a spectral filter used for this purpose, there are several possibilities which are associated with the respective method to be chosen for background determination and which are described in detail further below. However, the principle that the spectrally narrowband laser radiation leads to imaging of the laser spot only in the P-image, i.e. the spectral transmission for the laser light is present only in the case of the filter belonging to the P-image, is used in all cases. Similarly to the light/dark differential image, the laser spot can be distinguished from the background radiation as a result of the difference between P-image and N-image.

In contrast to the light/dark differential image of the prior art, however, no problems arise in the case of the spectral differential image with a rapidly variable environment since the two images can be illuminated at exactly the same time and the read-out speed of the data is no longer time-critical.

The following description is based, by way of example and for reasons of simplicity, on the simultaneous recording of two images, but the method can also readily be carried out with a larger number of recordings, i.e. both P-images and N-images, these being recorded at the same time or at times sufficiently close to one another.

The sensor array converts the intensity distribution into a signal which, for better distinguishability (for example from the sighting laser signal), is referred to below as image. Depending on the design of the sensor array, one-dimensional images (line sensor) or multi-dimensional images (e.g. area sensors) are therefore recorded so that the term image is not limited entirely to two-dimensional images. The method can also be used generally for other sensor geometries, such as, for example, linear arrangements of detector components. In this example, the position of the light spot can be determined by projecting the two-dimensional image by means of a cylindrical lens onto a one-dimensional array. In combination with an image rotated through 90°, it is then possible to extract the coordinates of the light spot also with linear arrangements.

Here, the term "recording of an image" is also intended to include processing of the image before the use of the image according to the method.

The P-image is recorded spectrally narrowband for a range which covers the range around the laser frequency. The width of the bandpass filter used, which is referred to below as a positive filter, is limited by the device scattering and the temperature drift of the laser radiation. If light spots of broadband sources are to be detected, as accurate a knowledge as possible of the spectral curve of the emission will be required in order to be able to derive as good a ratio as possible of signal to background.

In the case of the N-image, the sighting laser radiation is excluded from the imaging by a spectral filter which is referred to below as a negative filter, so that the intensity or image brightness of a section of the background is measured without sighting laser radiation. The image brightness measured is that which is (often approximately linearly) related to the integral of the spectral intensity distribution over the measured wavelength range. This physical relationship between intensity and image brightness is assumed below in the description of the method and in particular in the derivation or estimation of the image brightness of the background in the P-image. If the spectral intensity of the measured section is approximated by the sensor signal, the image brightness can also be replaced below, in context, by the term intensity.

The brightness and intensity of the background in the P-image can be deduced from the image brightness measured in the N-image and the intensity or intensity distribution respectively. Depending on the existing problem, different curves of the spectral intensity distribution of the interfering radiation are taken as a basis for this purpose.

Such spectra of the interfering radiation can either be calculated on the basis of physical models, for example, for a Planck emitter or laser radiation or be directly measured in the case of constant conditions. In the case of recurring, identical conditions, a stored spectrum can then be used and optionally also continuously adapted or updated.

The image brightness derived in this way for the background radiation acting as interfering radiation serves as a basis for a subtraction of the background from the P-image and hence for the separation of the target signal from the interfering radiation background.

In contrast to the prior art, no problems arise for the method according to the invention and the device according to the invention in the case of rapidly variable contents of the field of view, such as, for example, rapidly moving interfering objects or movement of the sensor system.

The interference suppression is also possible by means of sensor arrays in the lower price segment. Comparatively low measuring frequencies present in the case of these sensors are not a problem in the evaluation using this method. Thus, a reliable, economical position determination for laser spots is permitted with high positional resolution.

The method has advantages particularly when sensor arrays are used for increasing the positional resolution of a laser spot search.

The method according to the invention and a device which can be used therefor are described in more detail below, purely by way of example, with reference to embodiments shown schematically in the drawing. The variants shown differ in the choice of the fundamental model for the spectrum of the background radiation to be suppressed and hence both in the negative filer used and in the method for extrapolating the N-image intensity to the wavelength of the P-image. Specifically,

DETAILED DESCRIPTION

Figure 1:
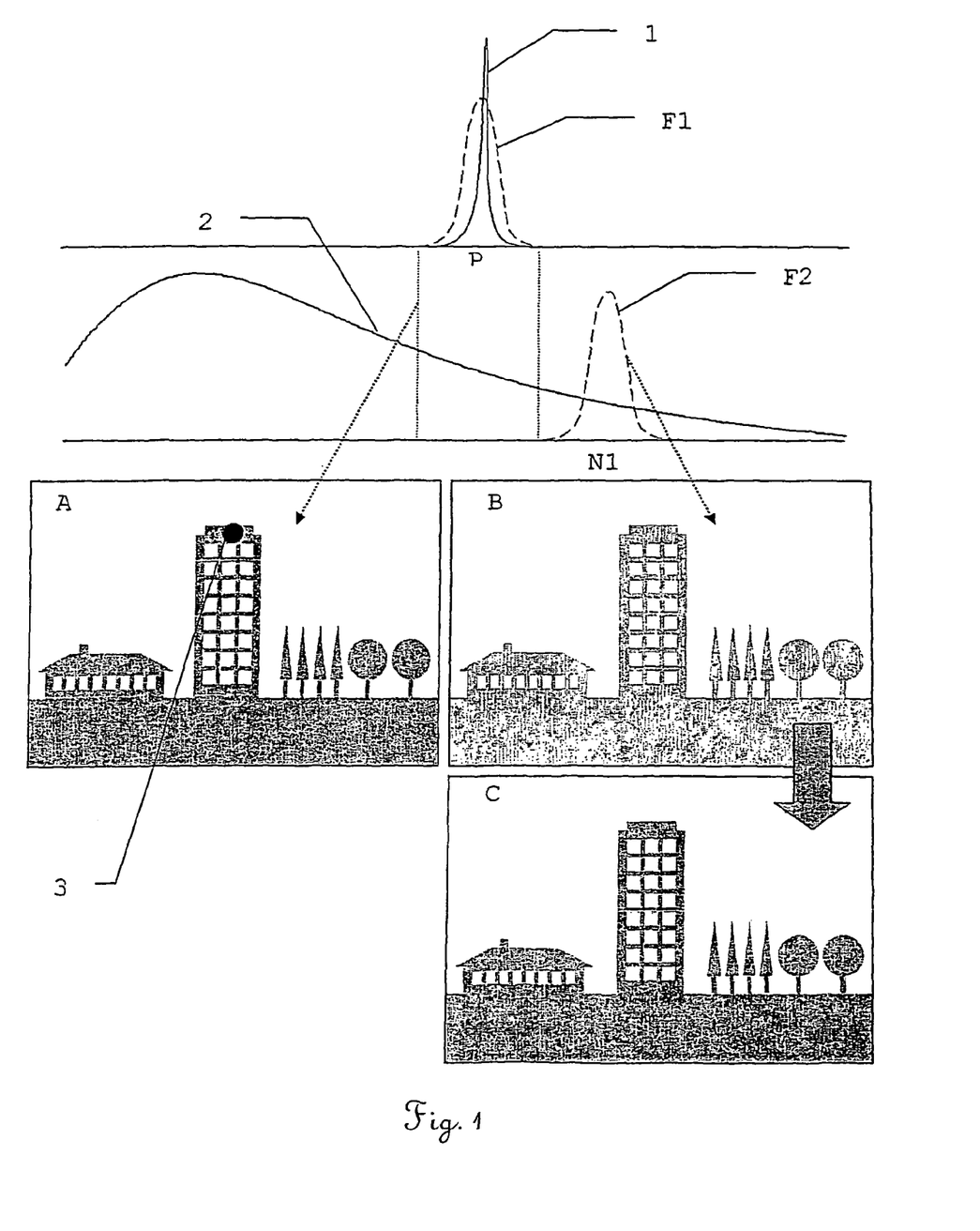
FIG. 1. shows the schematic diagram for the steps for deriving a background from P- and N-images for a method according to the invention.

FIG. 1 schematically shows the derivation of a background C for a P-image A which contains a laser spot 3 which is used, for example, for marking a point to be measured on a building. This diagram describes, purely schematically and in general formulation, the fundamental concept of the method according to the invention, without being concerned with special application-related specifics, in particular with regard to the number and design of filters. These are shown by way of example for some examples in the other figures.

In the upper part of the figure, the separate, spectral curves of the laser radiation 1 are shown as a signal to be extracted and a background radiation 2. The laser radiation 1 has a line character while the background radiation or interfering radiation has, by way of example, the continuous spectral curve of a thermal emitter or of an approximately thermal emitter, such as, for example, sunlight. However, the background radiation can also originate, for example, from a further laser which is used, for example, for parallel distance measurement and hence can likewise have a line character. The images A, B and C each show the same image section but with differences regarding the spectral ranges and image brightnesses or intensities.

A P-image A and an N-image B are recorded at the same time or at least about the same time for two wavelength ranges P for the P-image A and N1 for the N-image B, limited by spectral filters having the filter characteristics F1 and F2. The wavelength range P is chosen so that the laser radiation 1 is detected. In addition to the laser radiation 1, however, the P-image A also contains that proportion of the background radiation 2 which is present in the wavelength range P. The wavelength range N1 may be on the short- or long-wave side of the wavelength range P. The N-image B now contains virtually only background radiation, but optionally also proportions of the laser radiation 1, for example, with a broad filter characteristic F2 or a small distance of the filter from the wavelength of the laser radiation 1.

From that section of the background radiation 2 which is detected in the N-image, the proportion of background radiation 2 in the section detected by the filter characteristic F1 is derived or estimated on the basis of a model for the spectral curve thereof. This proportion corresponds to the image C, which, apart from the laser spot 3, should now ideally have the same image content as the P-image A.

Figure 2:
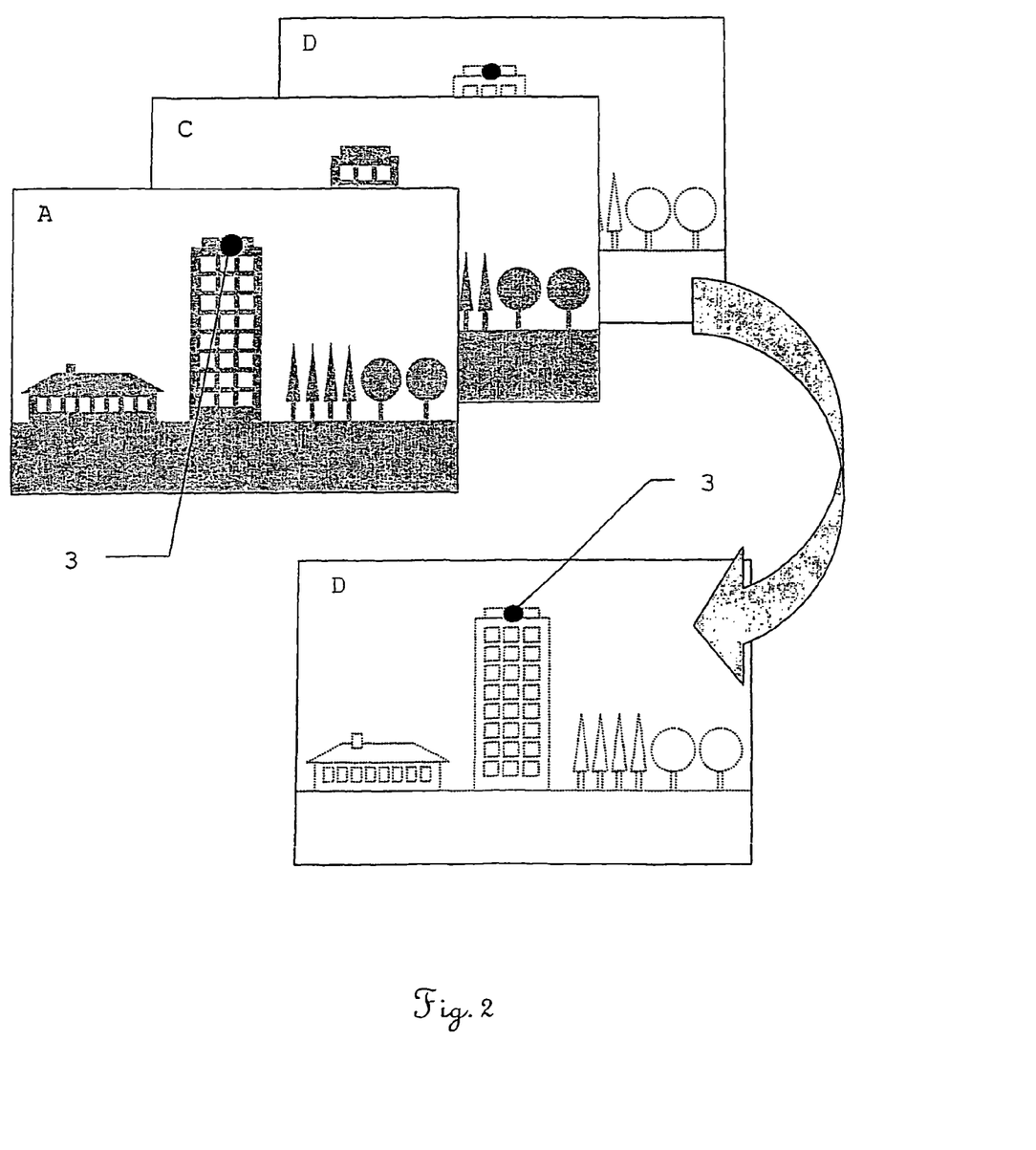
FIG. 2. shows the schematic diagram for the subsequent steps for suppressing a background in the P-image for a method according to the invention.

The use of the resulting images A and C for deriving the position of the laser spot 3 is shown schematically in FIG. 2. The image C derived from the N-image and containing only background radiation 2 is subtracted from the P-image A, which includes the laser spot 3 in addition to a proportion of background radiation 2. The difference is the image D, which now contains only the laser spot 3. The contour of the image content, which is the same for both images, is represented by a dashed line.

However, the use of a pure subtraction of the image contents represents only one possibility for extracting the laser spot 3. For example, the difference in the image contents can also be quantified by calculating the quotient or by the, use of further information, for example, for special image areas and by means of other methods, for example, by neuronal networks.

Figure 3A:
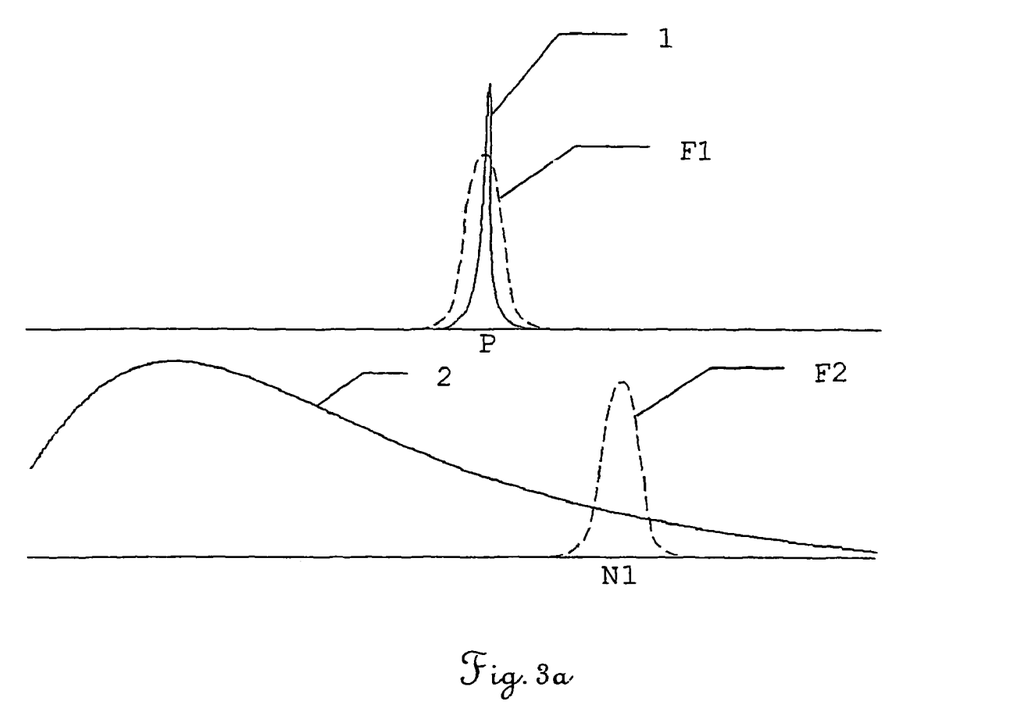
FIG. 3a-b show the schematic diagram of the physical relationships of a method according to the invention for suppressing spectrally broad interfering radiation as a two-band neighbourhood method.
Figure 3B:
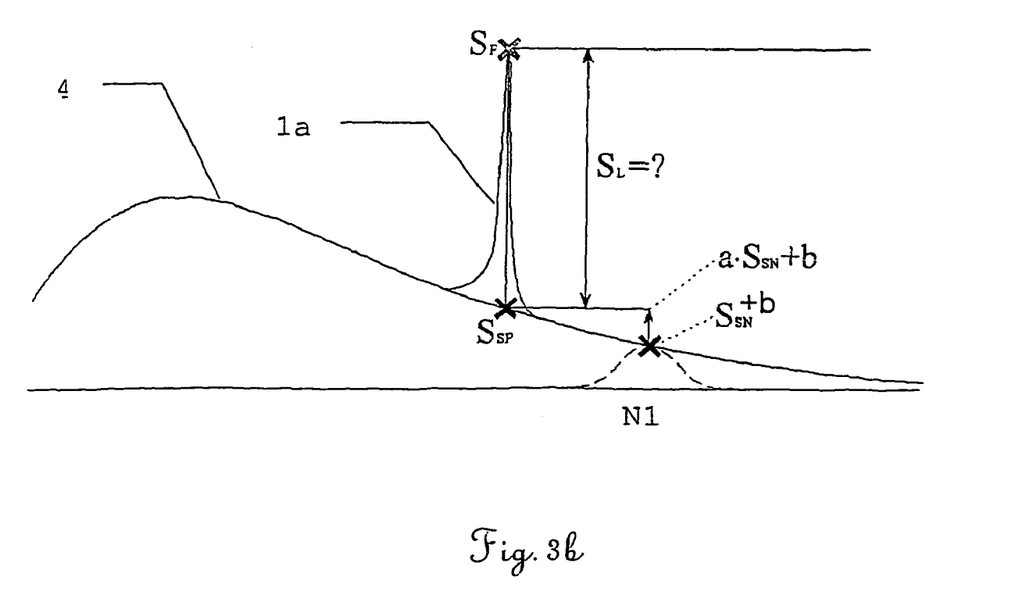

FIG. 3 schematically shows the suppression of the influence of spectrally broad interfering radiation by means of a two-band neighbourhood method with derivation of the proportion of background radiation in the P-image by way of example. The method corresponds to the procedure shown in principle and generally in FIG. 1 and FIG. 2, but uses a specific method of derivation.

A bandpass filter of spectral width similar to that for the P-image is used for the N-image. The central wavelength should be chosen in the vicinity of the laser radiation 1, but the wavelength range N1 of the N-image must be sufficiently far away from the wavelength range P of the P-image for the proportion of the laser signal in the N-image to remain small. The wavelength range N1 of the N-image can be chosen to be either shorter-wave or longer-wave than the wavelength range of the P-image.

The suppression of interference by sunlight (approximated as a Planck emitter with a temperature of 6,000 K) is chosen as an example. FIG. 3a shows the spectral transmission characteristic of the filers F1 and F2 used, together with the spectral intensity distributions of the laser radiation 1 (sighting laser) and of the background radiation 2.

FIG. 3b shows, for a section of the field of view of the sensor system (e.g. a pixel), the spectral intensity distribution of the registered radiation 4 which, in the spectral range of the P-image, contains both the proportion of the laser radiation 1 as peak 1a and that of the background radiation 2.

In the wavelength range N1 of the N-image, an image brightness value $S_{SN}$, which has an (approximately) linear relationship with the intensity of the interfering radiation $I_{SN}$, is measured. The image brightness-value $S_{SN}$ is converted by a linear brightness adjustment (parameters a,b) into an estimation of the image brightness in the P-image $S_{SP}$, generated by the interfering radiation:

$$S_{SP} \approx a \cdot S_{SN} + b \qquad (1)$$

The quantities $S_{SP}$ and $S_{SN}$ are shown in FIG. 3b, and the parameters (a,b) are determined on the basis of an approximation selected from the point of view of sufficient accuracy; for example, an approximation of the spectrum of the interfering radiation 2 which is linear in sections can be achieved in this manner. For position determination, the image brightness $S_L$ generated by the sighting laser signal is extracted. For this purpose, a calculation of the difference of the image brightness $S_P$ measured in the P-image, and the estimation for $S_{SP}$ is carried out:

$$S_L \approx S_P - (a \cdot S_{SN} + b) \qquad (2)$$

In this example, the conversion of the image brightness of the N-image to the image brightness, generated by the background radiation, in the P-image (brightness adjustment in the N-image) is achieved by a numerical method by multiplication by the constant factor a and addition of a constant b. Alternatively, an identical effect can also be achieved by corresponding amplification or attenuation of an analogue image signal (brightness adjustment by analogue electronics).

In both cases, the adjustment can also be carried out as a nonlinear adjustment, a and b then being functions of the image brightness. For example, a nonlinear brightness adjustment may be necessary particularly when the interfering radiation is narrowband and of high intensity (for example, laser sources which are present in addition to the sighting laser) or when saturation effects occur in the case of the sensors.

A linear brightness adjustment of the N-image can also be achieved by a suitable choice of the transmittances of a positive filter and negative filter. This corresponds to a brightness adjustment by a physical method.

In the case of the brightness adjustment of the N-image, on the one hand the change in the spectral energy distribution between P-image wavelength and N-image wavelength is taken into account. On the other hand, attention should be paid to any sensor sensitivity differing at the two wavelengths. If the result of the two effects together is negligible, a brightness adjustment can be completed omitted.

A precondition for the use of this method is that the spectral characteristic of the interfering radiation in the field of view considered does not change greatly, since otherwise the exact curve can be estimated only with difficulty by a measurement using a filter. An example of interfering radiation with a small change is, for example, a purely thermal emission, such as, for example, the light of an incandescent bulb. Furthermore, problems may arise with spectrally selective reflectors (in the measurement in the visible range of the electromagnetic spectrum: coloured objects). Such problems can be counteracted by a suitable choice of the filter characteristics for P-image and N-image (preferably for both with wavelength windows in the infrared range).

FIG. 4 describes the physical relationships in the case of the suppression of the influence of interfering radiation with varying spectrum or with objects with spectrally selective reflection by a three-band neighbourhood method.

This can be used in particular if the sighting laser wavelength cannot be freely chosen or the spectral distribution of the illumination which differs greatly as a function of position and/or as a function of time predominates.

Figure 4A:
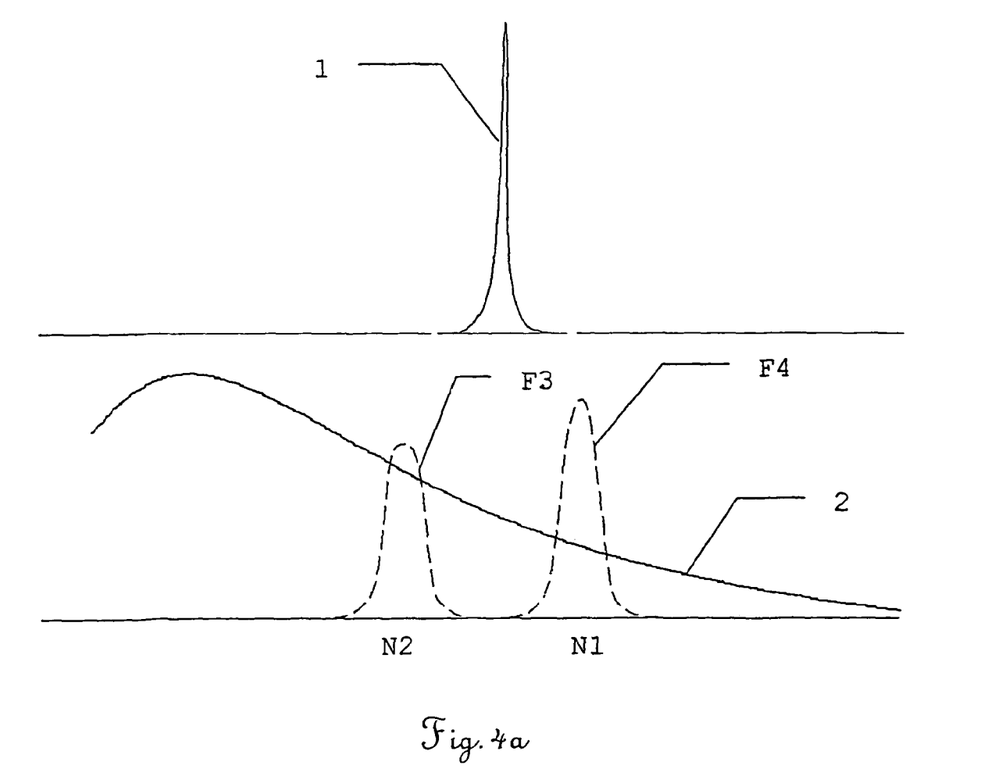
FIG. 4a-d show the schematic diagram of the physical relationships of a method according to the invention for suppressing an interfering radiation background with varying spectrum or with objects with spectrally selective reflection as a function of time or position, as a three-band neighbourhood method.

Two N-images are used in a first version. Spectral bandpass filters are used for both N-images. The filter characteristics F3 and F4 for the two N-images, with unchanged P-image, i.e. an image recording using a filter having the same filter characteristic as in the preceding figures, are shown in FIG. 4a.

The central wavelengths of the two bandpass filters should be chosen in the vicinity of the wavelength of the laser radiation 1 of the sighting laser. An N-image (N1-image) is recorded at a longer wavelength and the second N-image (N2-image) at a shorter wavelength than the P-image.

The central wavelengths of the two bandpass filters should be sufficiently far away from the wavelength range of the P-image so that the proportion of the laser radiation 1 of the sighting laser remains small both in the N1-image and in the N2-image.

Figure 4B:
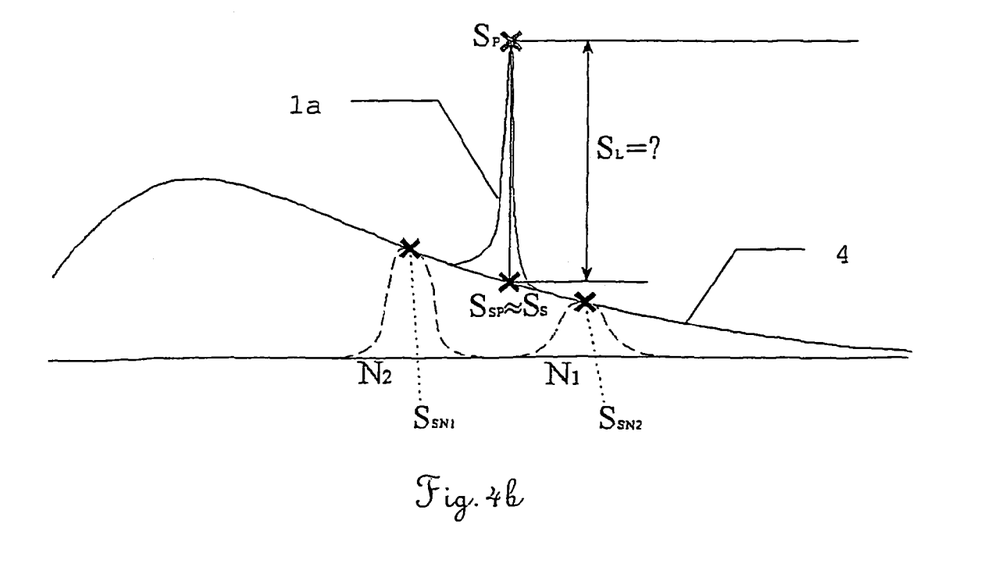

FIG. 4b schematically shows the spectral intensity of the registered radiation 4, which is recorded from a section of the field of view of the sensor system (e.g. pixel), which contains, in the spectral range of the P-image, both radiation intensity from the laser radiation 1 as peak 1a and from the background radiation 2.

The image brightness values in the two N-images are measured: $S_{SN1}$, $S_{SN2}$. $S_S$ is calculated therefrom by linear superposition $$S_s = a_1 \cdot S_{SN1} + a_2 \cdot S_{SN2} + b \qquad (3)$$

and permits an estimation of the image brightness $S_{SP}$ generated by the interfering radiation in the P-image:

$$S_{SP} \approx S_S$$

Once again, the image brightness $S_L$ generated by the sighting laser signal in the P-image is extracted as a basis for the position determination. For this purpose, the difference between the image brightness $S_P$ measured in the P-image and the estimation for $S_{SP}$ is calculated:

$$S_L \approx S_P - S_S \qquad (4)$$

The linear estimation of $S_{SP}$ shown here can also be carried out nonlinearly. For this purpose, functions of the local image brightness $a_1(S)$, $a_2(S)$, $b(S)$ are used instead of the constant parameters $a_1$, $a_2$, b.

In each case, the calculation of the estimation $S_S$ can be adapted to the sensitivity characteristic of the sensor and to the transmission behaviour of the filters N1 and N2. Additional knowledge about the spectral distribution of the background radiation can also be taken into account in the calculation of the estimation $S_S$. In the example mentioned here, the calculation of the estimation $S_S$ is carried out by a numerical method.

Alternatively, $S_S$ can also be determined by corresponding amplification or attenuation by analogue electronics. Finally, the estimation $S_S$ can also be achieved by a physical method, by a suitable choice of the filter characteristics N1 and N2.

Any changes in the spectral intensity are eliminated in this way by the two averaged wavelength ranges, and an evaluation using different background spectra or using interfering objects having very different spectral reflections is also possible.

Figure 4C:
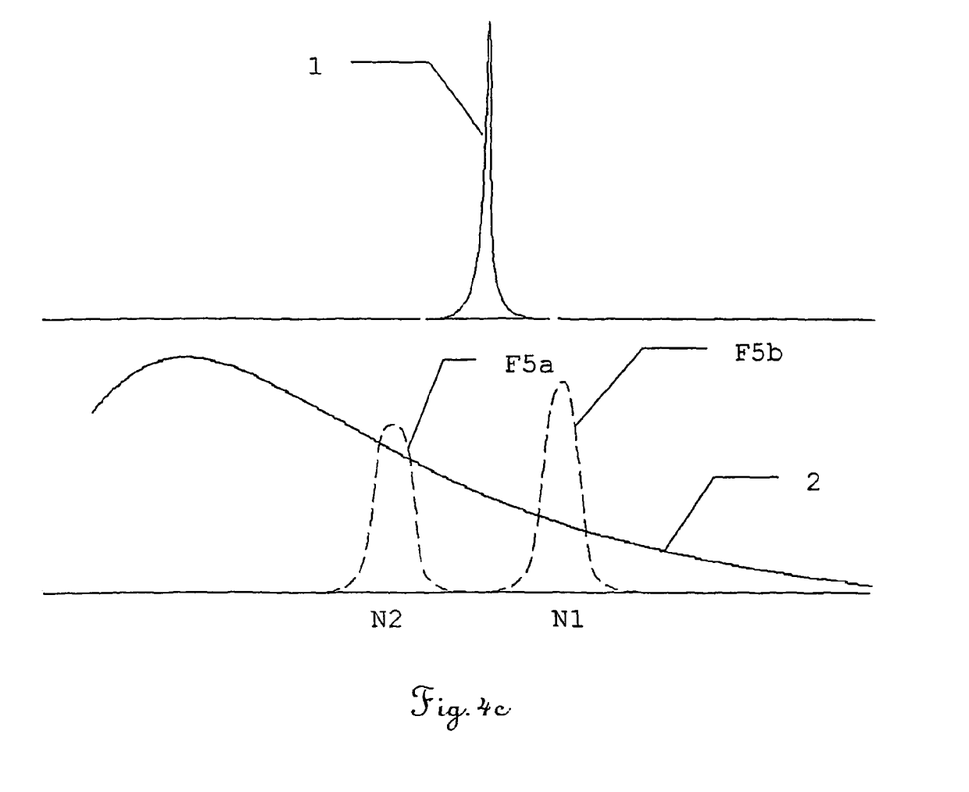

The three-band neighbourhood method can be carried out for spectrally broadband interfering radiation also by recording only one N-image. Instead of a bandpass filter, a filter having two passbands is used. The overall filter characteristic with the two partial filter characteristics F5a and F5b for the N-image, with unchanged P-image, is shown in FIG. 4c. A filter having two wavelength ranges N1 and N2 is used as passbands. These two wavelength ranges N1, N2 should be chosen on the short- and long-wave side of the wavelength range P of the P-image, and an input by the laser radiation 1 into the N-image or its wavelength ranges N1, N2 must not be too large.

Figure 4D:
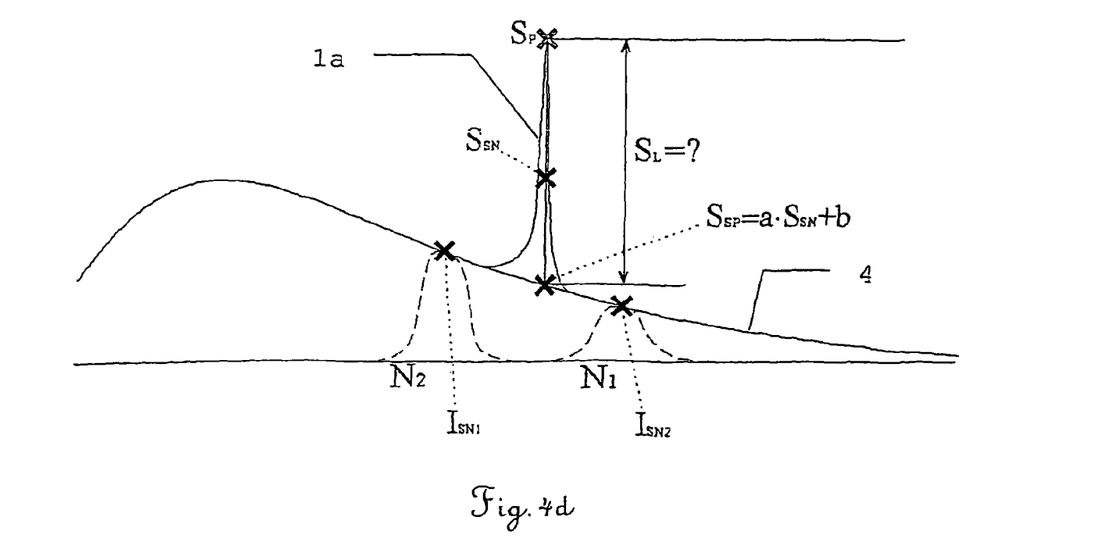

FIG. 4d schematically shows the spectral intensity distribution of the registered radiation which is recorded from a section of the field of view of the sensor system (e.g. pixel), which, in the spectral range of the P-image, contains both radiation intensity of the laser radiation 1 as peak 1a and of the background radiation 2.

The spectral filter of the N-image has two passbands in the wavelength ranges N1 and N2. Two intensities ($I_{SN1}$ and $I_{SN2}$) which contribute to the imaging in the N-image correspond to these two passbands. The measured image brightness values in the N-image SSN are obtained from the linear superposition of these-two intensities.

If the spectrum of the interfering radiation 4 in the range of the passbands of positive filter and negative filter is broadband, the spectral intensity distribution of the interfering radiation $\rho(\lambda)$ in this range can be linearly approximated:

$$\rho(\lambda) \approx k_1 \lambda + k_2 \quad (5)$$

By a suitable choice of the two filter characteristics F5a and F5b it is possible to ensure that, between the image brightness values in the N-image $S_{SN}$ and the image brightness values generated by the interfering radiation in the P-image $S_{SP}$, there is a linear relationship independent of $k_1$ and $k_2$:

$$S_{SP} = a \cdot S_{SN} + b \quad (6)$$

For the position determination, the image brightness $S_L$ generated in the P-image is extracted. For this purpose, a calculation of the difference between the image brightness values $S_P$ measured in the P-image and the estimation for $S_{SP}$ is carried out:

$$S_L = S_P - (a \cdot S_{SN} + b) \quad (7)$$

This estimation remains valid independently of the parameters $k_1$ and $k_2$ of the linear approximation of the interfering radiation spectrum. It is therefore possible by this method also to separate the target signal from interfering radiation having a spectrum variable as a function of space or time. The only precondition is that the spectrum be capable of good linear approximation in the evaluation range (transmission range of negative filter).

In this example, the conversion of the image brightness values from the N-image to the image brightness generated by the interfering radiation in the P-image (brightness adjustment in the N-image) is achieved by a numerical method by multiplication with the constant factor a and addition of a constant b. Alternatively, an identical effect can also be achieved by corresponding amplification or attenuation of an analogue image signal (brightness adjustment by analogue electronics).

In both cases, the adjustment can once again also be carried out nonlinearly, a and b then being functions of the brightness values. By means of a nonlinear brightness adjustment, the image brightness caused by interfering radiation in the positive image can be estimated more exactly. This is carried out particularly in the case of narrowband interfering radiation or if saturation effects occur in the sensors.

The relative height of the two transmission maxima of the negative filter is adjusted to the sensitivity characteristic of the sensor. In FIG. 4c, the heights of the two maxima are chosen so that a lower sensitivity of the sensor system in the long-wave range, which is present during measurement in the infrared range, is counteracted. Additional knowledge about the spectral distribution of the background radiation can also be taken into account in the relative heights of the two transmission maxima of the negative filter.

Any changes in the spectral intensity are eliminated in this way by the two averaged wavelength ranges, and an evaluation using different background spectra or using interfering objects with spectrally very different reflectivities is also possible.

Figure 5A:
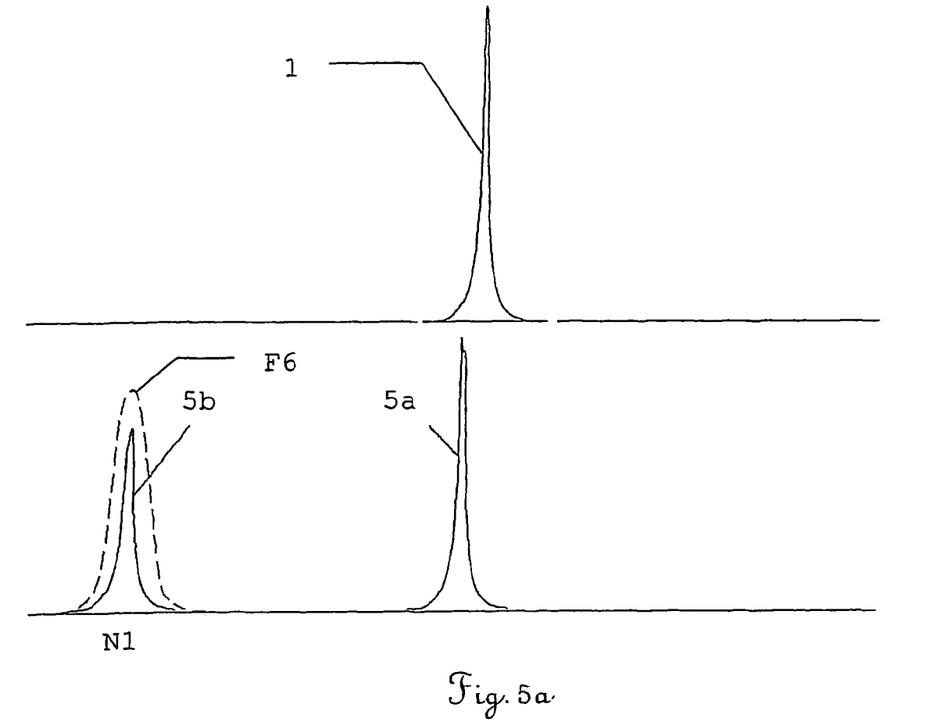
FIG. 5a-b show the schematic diagram of the physical relationships of a method according to the invention for suppressing the influence of interfering radiation with spectral line characteristic and FIG. 6 shows the schematic structure of a device for carrying out the method according to the invention.
Figure 5B:
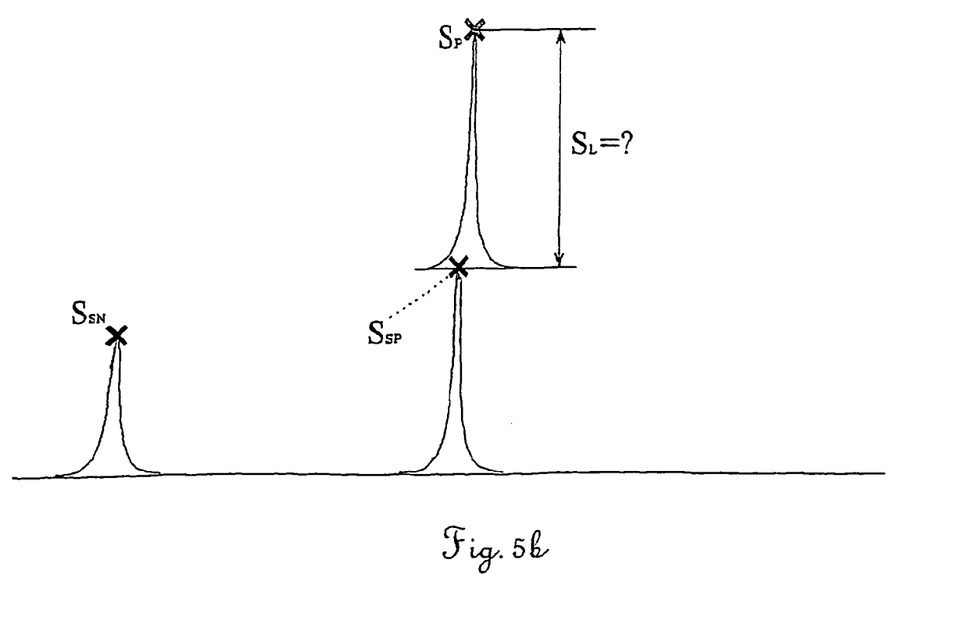

FIG. 5 schematically shows the physical relationships in the suppression of the influence of interfering radiation with a spectral line characteristic.

If the interfering radiation spectrum or background spectrum has a line characteristic, the image brightness caused by the background intensity in the P-image can be calculated from the N-image brightness in case of a known intensity relationship between the spectral lines. An example for interfering radiation with spectral line characteristic is the illumination of the measuring environment with gas discharge lamps or fluorescent tubes, which is widely used in the industrial sector.

FIG. 5a shows the spectral filter characteristic F6 for the negative filter in the case of an unchanged positive filter, i.e. a filter having the same filter characteristic as in the preceding figures.

The passband of the negative filter F6 is chosen at the wavelength of a spectral line of the background radiation, but outside the peak of the laser radiation 1. An image section which, as detected radiation, receives intensities both from the background radiation (lines 5a and 5b) and from the laser radiation 1 is considered.

FIG. 5b shows the spectral intensity distribution of the registered radiation for this image section.

An estimation for the image brightness through interfering radiation in the P-image $S_{SP}$ can once again be calculated by linearly converting the image brightness values of the interfering radiation or background radiation in the N-image $S_{SN}$ (linear rightness adjustment with parameters a,b):

$$S_{SP} \approx a \cdot S_{SN} + b \quad (8)$$

This estimation is possible if, for example, the relative intensities of different line emissions are known. As a basis for the position determination, the image brightness $S_L$ caused by the sighting laser signal in the P-image is extracted. For this purpose, a calculation of the difference between the image brightness values $S_P$ measured in the P-image and the estimations for $S_{SP}$ is once again performed:

$$S_L \approx S_P - a \cdot S_{SN} + b \quad (9)$$

As shown under FIG. 3, the brightness adjustment of the N-image can be performed linearly but can also be carried out nonlinearly, it being possible for the brightness adjustment to be carried out numerically, by means of analogue electronics or by a physical method.

In the brightness adjustment, both the different intensity in both spectral lines and the different sensitivity of the sensor system in both wavelength ranges can be taken into account.

Figure 6:
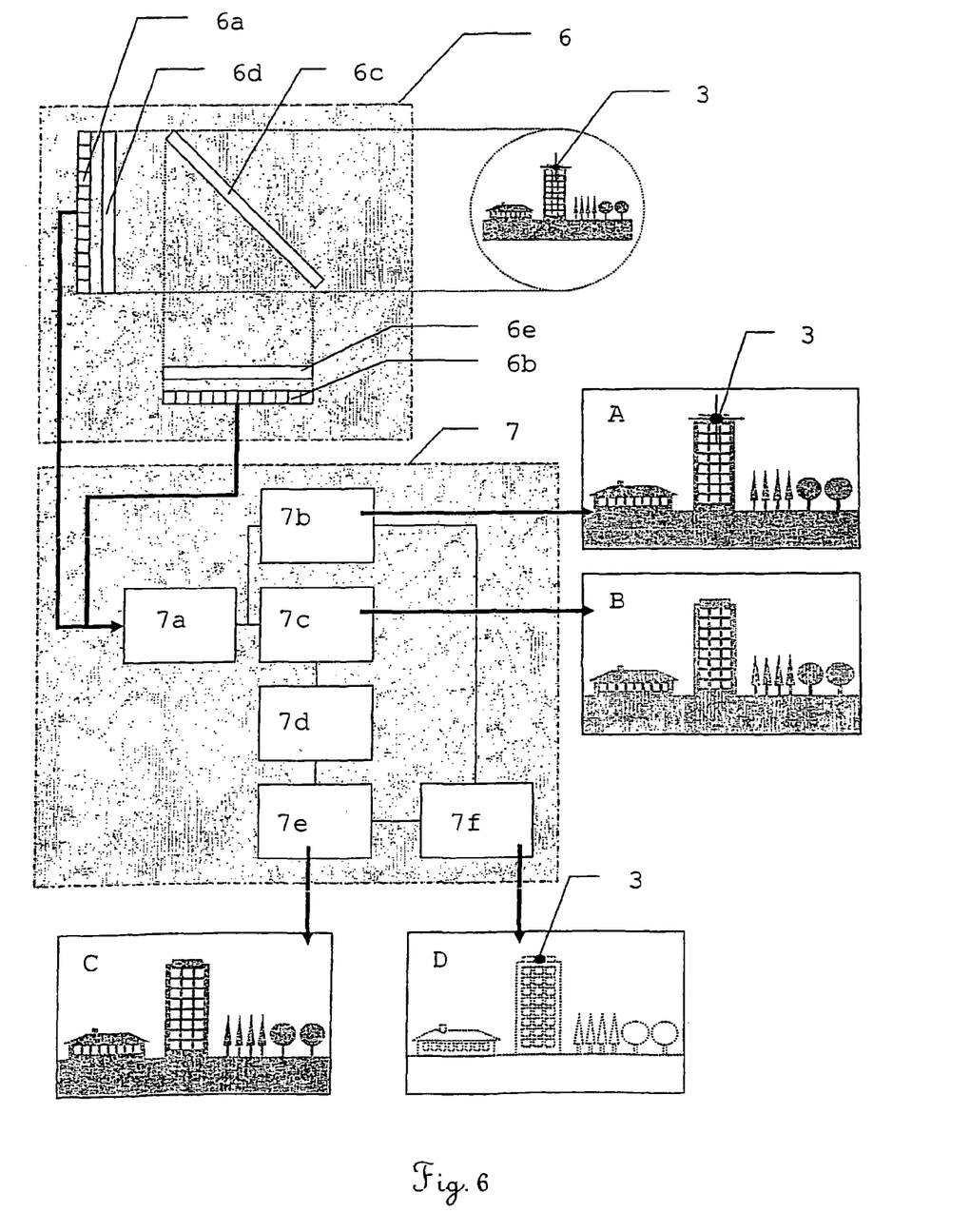

FIG. 6 schematically shows an example for realising a device according to the invention. The image section which is to be analysed and has a laser spot 3 to be detected is sensed by the means for recording electromagnetic radiation 6 and is passed via a beam splitter 6c and two detectors 6a and 6b, each having an upstream filter 6d and 6e. The detectors 6a and 6b in turn consist of a multiplicity of detector components. The two filters 6d and 6e have different spectral characteristics, so that a P-image A with laser spot 3 is recorded by the detector 6a and an N-image B in a spectral, range without laser radiation is recorded by the detector 6b.

In each case at least one image is recorded here by two separate detectors having differing spectral recording capabilities. In the same way, it is also possible to employ the same detector, but changed recording capability, quickly in succession. The spectrally selective limitation of the recording can be carried out here by means of bandpass filters which are inserted or rotated into the beam path in front of the detector, for example, by means of a drum or a revolver holder.

A further possibility for recording at least two spectrally selective images is the division of a sensor array into individual sensors of different spectral receiving characteristics, for example, by mounting different types of filters in a manner variable as a function of position.

In all cases, however, the use of spectrally selective filters can also be replaced by the use of spectrally selective detectors, for example, by changing the spectral response behaviour of the detector directly by the choice of the detector material or by controlling the physical behaviour of the detector. In addition, the at least two spectrally selective images can be recorded by using a sensor array if each individual sensor of the sensor array is capable of carrying out measurements in a plurality of spectral ranges.

Both images A, B are transmitted to the means for signal and information processing and are stored there in two image memories 7b and 7c, after orientation by rotational and translational positioning via an orientation unit 7a. The highly accurate orientation of the images relative to one another or to a reference quantity can be carried out during the recording itself or during subsequent steps of the image processing. An example of the orientation closely similar to the recording is the highly accurate adjustment of the detectors relative to one another. Alternatively or in addition, the positioning can be performed by digital signal processing during subsequent processing steps.

An image C which corresponds to the background radiation of the P-image A is derived from the N-image B by a computing unit 7d and is stored in the image memory 7e. The derivation of the intensity of the background radiation is effected, for example, by digital or analogue electronics or, as described further above, by a purely physical method. The number of image memories can be varied depending on the design of the device.

Depending on specific design, it is also possible to record a plurality of P- and N-images A, B and to process them in each case in pairs or after aggregation, for example, after respective superposition of all P- and N-images to give an aggregate.

By means of an evaluation and comparison unit 7f, the image contents of the images A and C stored in the image memories 7b and 7e are compared and the image D is derived, from which the position of the laser spot 3 follows. In the simplest case, a straightforward calculation of the difference between the two image contents is calculated, in which in each case pixels having identical positions and identical image brightness value or identical content are completely eliminated from the image. If pixels of the same position differ in their content, net brightness values remain, which may give a further intermediate image and optionally may also be further analysed. Thus, it is possible in addition or alternatively to use further image processing steps in association with the comparison of the image contents, which image processing steps process, for example, further information, for example, for suppressing detector noise.

It is also possible, by measuring a plurality of N-images, to use the individual methods described in FIG. 3 to FIG. 5 in order in each case to estimate proportions of the interfering radiation intensity in the P-image. From these proportions, it is possible to derive the total intensity of the interfering or background radiation in the P-image more exactly than is possible by the individual methods.

The images shown in FIG. 1-FIG. 5 and curves and profiles of the models of a spectral intensity and the filters used are to be understood in purely qualitative terms. Grey steps shown and differences to be derived explain resulting effects qualitatively and cannot serve as a basis for quantitatively exact considerations.

The extraction of the signal of the sighting laser by subtraction is to be understood, in the formulae 2, 4, 7, 9 and in the description for FIG. 6, only as an example of the numerous possibilities for the combination of image information of the P-image and the estimation generated from the N-image for the interfering radiation intensity.

A further example of such a combination is the weighted averaging of extracted image features (feature extraction). Here, image features are extracted from a plurality of image areas and in each case averaged with the reciprocal value of the estimation of the interfering radiation intensity in the evaluated area after weighting.

The device according to the invention, shown in FIG. 6, is only one exemplary form for the realization, which thus represents only one specific design among many alternatives. Thus, for example, the image memories 7b-7c can be reduced or increased in their number and may also be coordinated with the means for recording electromagnetic radiation. In particular, the use of an individual detector, for example, with sequential recording of two or more images or with simultaneous recording of images by detector components having spectrally different selectivities, is also possible.

The method and in particular the derivation of the image brightnesses of the background can be carried out both at the level of the total image, i.e. for all image pixels together, and at the level of image sections or image parts or down to the level of individual pixels, in each case separately. For example, additional knowledge, for example, about individual parts of the image, can also be utilised.

Of course, the figures shown represent one of many embodiments, and a person skilled in the art can derive alternative forms of realisation, for example, with the use of other means for limiting the transmission of electromagnetic radiation or with the use of filters having other characteristics. Furthermore, the coordination of the various methods with interfering radiation types or properties is not to be understood as being exclusive. The methods described can in principle be used for suppressing any forms of backgrounds or interfering radiation sources.

The invention claimed is:

1. A method for suppressing electromagnetic background radiation in a defined spectral range relative to a signal to be detected, comprising:
    recording electromagnetic radiation of:
        at least one uni-dimensional or multidimensional P-image in the defined spectral range (P), and
        at least one uni-dimensional or multidimensional N-image in at least one further defined spectral range differing from that of the at least one uni-dimensional or multidimensional P-image; and
    performing signal and information processing on the at least one uni-dimensional or multidimensional P-image and on the at least one uni-dimensional or multidimensional N-image,
    wherein an image brightness $S_{sp}$ of the background radiation in the P-image is deduced on the basis of a physical model of the spectral distribution of the background radiation or a spectral curve which is directly measured,
    the signal to be detected is extracted based on the at least one uni-dimensional or multidimensional P-image and the at least one uni-dimensional or multidimensional N-image,
    the spectral ranges of the at least one uni-dimensional or multidimensional P-image and of the at least one uni-dimensional or multidimensional N-image are determined as a two-band neighbourhood method by a choice of a wavelength band in each case for the at least one uni-dimensional or multidimensional P-image and the at least one uni-dimensional or multidimensional N-image,
    the wavelength band of the at least one uni-dimensional or multidimensional N-image is either on a short-wave or on a long wave side of the wavelength band of the at least one uni-dimensional or multidimensional P image,
    wherein the number of dimensions of the at least one uni-dimensional or multidimensional P-image and the at least one uni-dimensional or multidimensional N-image are the same.

2. A method for suppressing electromagnetic background radiation in a defined spectral range relative to a signal to be detected, comprising:
    recording electromagnetic radiation of
        at least one uni-dimensional or multidimensional P-image in the defined spectral range, and
        at least one uni-dimensional or multi-dimensional N-image in at least one further defined spectral range differing from that of the at least one uni-dimensional or multidimensional P-image being recorded during the recording electromagnetic radiation,
    performing signal and information processing on the at least one uni-dimensional or multidimensional P-image and on the at least one uni-dimensional or multidimensional N-image,
    wherein an image brightness $S_{sp}$ of the background radiation in the at least one uni-dimensional or multidimensional P-image is deduced on the basis of a physical model of the spectral distribution of the background radiation or a spectral curve which is directly measured,
    the signal to be detected is extracted based on the at least one uni-dimensional or multidimensional P-image and the at least one uni-dimensional or multidimensional N-image,
    the spectral ranges of the at least one uni-dimensional or multidimensional P-image and of the at least one uni-dimensional or multidimensional N-image are determined by a choice of at least one wavelength band in each case for the at least one uni-dimensional or multidimensional P-image and the at least one uni-dimensional or multidimensional N-image,
    the wavelength bands each sense different lines,
    wherein the number of dimensions of the at least one uni-dimensional or multidimensional P-image and the at least one uni-dimensional or multidimensional N-image are the same.

3. The method according to claim 1,
    wherein the spectral range of the at least one uni-dimensional or multidimensional N-image is determined by the choice of two wavelength bands, and
    the two wavelength bands of the at least one uni-dimensional or multidimensional N-image are on the short wave or long wave side of the wavelength band of the at least one uni-dimensional or multidimensional P-image.

4. The method according to claim 1 further comprising,
    deriving the image brightness $S_{sp}$ of the background radiation by carrying out the steps of the method of claim 1 several times for multiple spectral ranges for estimating and eliminating contributions of different interfering radiation sources,
    wherein the image brightness $S_{sp}$ of the background radiation is derived.

5. The method according to claim 1,
    wherein the deduction of the image brightness $S_{sp}$ of the background radiation in the at least one uni-dimensional or multidimensional P-image is carried out using at least one of the following methods:
        extrapolation of at least one image brightness $S_{SN}$ recorded in the at least one uni-dimensional or multidimensional N-image, and
        calculation of a weighted mean value of at least two image brightnesses $S_{SNi}$ recorded in the at least one uni-dimensional or multidimensional N-image.

6. A device for suppressing electromagnetic background radiation in a defined spectral range relative to a signal to be detected, comprising means for recording electromagnetic radiation, comprising:
    means for recording electromagnetic radiation,
        the means for recording electromagnetic radiation being designed for recording of at least one uni-dimensional or multidimensional P-image and at least one uni-dimensional or multidimensional N-image; and
    means for signal and information processing, the means for signal and information processing being designed so that electromagnetic background radiation can be suppressed from the different content of the at least one uni-dimensional or multidimensional P-image and the at least one uni-dimensional or multidimensional N-image adjusted by the means for signal and information processing,
    wherein the means for recording electromagnetic radiation have at least two detectors for recording images in at least two different, defined spectral ranges,
    the means for signal and information processing are designed so that the electromagnetic background radiation can be suppressed on the basis of a physical model of the spectral distribution of the background radiation or a spectral curve which is directly measured,
wherein the number of dimensions of the at least one uni-dimensional or multidimensional P-image and the at least one uni-dimensional or multidimensional N-image are the same.

7. The device according to claim 6,
wherein the spectral range of the means for recording electromagnetic radiation is limited by a spectral filter or the means for recording electromagnetic radiation has at least one detector which comprises two or more semiconductor materials which result in a spectrally selective response behaviour of the detector.

8. The device according to claim 6,
wherein the means for signal and information processing is designed so that the at least one uni-dimensional or multidimensional P-image and the at least one uni-dimensional or multidimensional N-image are translatable or rotatable relative to one another and can be changed on a relative imaging scale.

9. The device according to claim 6, further comprising a measuring instrument,
wherein the measuring instrument has a device for spectrally selective suppression of an electromagnetic background radiation to be detected.

10. A method for identifying a laser spot as a mark for subsequent measuring processes using a device according to claim 6.

11. A method for identifying a source of a laser spot using a device according to claim 6.

* * * * *